United States Patent
Lönnqvist et al.

(10) Patent No.: US 6,736,579 B2
(45) Date of Patent: May 18, 2004

(54) SCREW DEVICE AND ASSEMBLY FOR THEFT-PROOFING VEHICLE WHEELS

(75) Inventors: Christian Lönnqvist, Göteborg (SE); Ulf Andersson, Västra Frölunda (SE); Lars Lindblad, Göteborg (SE); Conny Turesson, Hisings-Backa (SE); Björn Sandblom, Hisings-Backa (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/882,878

(22) Filed: Jun. 15, 2001

(65) Prior Publication Data

US 2002/0014137 A1 Feb. 7, 2002

Related U.S. Application Data

(63) Continuation of application No. PCT/SE99/01843, filed on Oct. 13, 1999.

(30) Foreign Application Priority Data

Feb. 18, 1998 (SE) .................................. 9804440-7

(51) Int. Cl.⁷ .................................................. F16B 23/00
(52) U.S. Cl. ........................................ 411/396; 411/910
(58) Field of Search .......................... 81/436; 411/402, 411/403, 910, 396, 901–903

(56) References Cited

U.S. PATENT DOCUMENTS

| | | | | |
|---|---|---|---|---|
| 3,175,593 A | * | 3/1965 | Launay | 81/436 |
| 3,241,408 A | | 3/1966 | McCauley | 81/71 |
| 3,519,979 A | * | 7/1970 | Bodenstein | |
| 4,480,513 A | * | 11/1984 | McCauley et al. | 81/436 |
| 4,645,397 A | * | 2/1987 | Howe | 411/910 |
| 4,723,866 A | * | 2/1988 | McCauley | 411/910 |
| 4,726,723 A | | 2/1988 | Bainbridge | 411/432 |
| 4,856,307 A | * | 8/1989 | Hauser | 70/165 |
| 4,875,819 A | * | 10/1989 | Wilkinson | |
| 5,062,325 A | * | 11/1991 | McCauley et al. | 81/436 |
| 5,112,176 A | * | 5/1992 | McCauley et al. | 411/910 |
| 5,449,260 A | | 9/1995 | Whittle | 411/377 |
| 5,797,659 A | * | 8/1998 | Fuller | 411/910 |
| 6,017,177 A | * | 1/2000 | Lanham | |

FOREIGN PATENT DOCUMENTS

GB 2298691 A 9/1996 ........... F16B/41/00

OTHER PUBLICATIONS

International Search Report for Application No. PCT/SE99/01843, dated Feb. 16, 2000 (mailing date).
Preliminary Examination Report for Application No. PCT/SE99/01843, dated Mar. 2, 2001 (report completion date).

* cited by examiner

Primary Examiner—Flemming Saether
(74) Attorney, Agent, or Firm—Howrey Simon Arnold & White LLP (57) ABSTRACT

A screw device, an assembly for theft-proofing vehicle wheels, and a motor vehicle with theft-proofed vehicle wheels is disclosed. The screw device has a screw with a head and a threaded portion intended to be screwed into a thread of a wheel hub, a sleeve and a lock member. The threaded portion is intended to be screw into the thread of the wheel hub via a recess arranged in a central portion of a vehicle wheel. The lock member is an endless, smoothly undulating or curved lock member. The dimensions of the sleeve are adapted to the dimensions of the recess so that regions of the central portion adjacent to the recess encompass substantially entirely and closely a circumference of the sleeve when the threaded portion has been screwed into the thread. The invention can be applied to all types of vehicle wheels, and is particularly advantageous for exclusive private cars with special rims.

8 Claims, 6 Drawing Sheets

SCREW DEVICE AND ASSEMBLY FOR THEFT-PROOFING VEHICLE WHEELS

CROSS REFERENCE TO RELATED APPLICATIONS

The present application is a continuation of PCT Application No. PCT/SE99/01843, filed Oct. 13, 1999, which claims priority to Swedish Application No. 9804440-7, filed Dec. 18, 1998.

BACKGROUND OF THE INVENTION

1. Technical Field

The present invention relates to a screw device and assembly for theft-proofing or making undue thefts of vehicle wheels more difficult. The invention further relates to a motor vehicle with vehicle wheels which have been theft-proofed by means of the screw device being part of the assembly. The invention can be applied on all types of vehicle wheels, which is particularly advantageous when exclusive private cars provided with special rims or the like are concerned.

2. Background Information

Recently, car thefts and other undue thefts such as thefts of vehicle wheels from unattended motor vehicles have become more and more common. Since vehicle wheels are expensive, such thefts result in a significant economic loss for the vehicle owner, particularly if the motor vehicle is provided with exclusive wheel rims with special design or the like.

Therefore, it is desirable to make it as difficult as possible for thieves or vandals to remove vehicle wheels from an unattended motor vehicle. A number of different devices and assemblies which render undue thefts of vehicle wheels difficult have been previously suggested.

For instance, U.S. Pat. No. 3,241,408 ("the '408 patent") discloses nuts or screws for retaining vehicle wheels that are reported to prevent thefts, and means for applying or removing such nuts or screws. According to the '408 patent, a threaded fastener for vehicle wheels has means adapted for engagement with a wrench for applying and removing the fastener from a cooperating threaded member. The means is a frusto-conical body having a relatively flat radial outer face at its small end and a curvilinearly extending channel of substantially constant width in the outer face, forming a continuous, closed figure substantially devoid of straight line portions and of varying curvature. As such, various portions of the closed figure lie at various distances from the axis of the frusto-conical body. In use, a projecting flange formation of the wrench fits within the channel of the means.

Furthermore, United Kingdom Patent No. GB 2 298 691 A discloses an anti-theft device for mounting an object, preferably a vehicle wheel. According to GB 2 298 691 A, unauthorized release of a bolt or a nut is prevented by a freely rotatable, frusto-conical bush fitted over the head of a fastener. Thereby, a ring fits into an annular groove on the outside surface of the head and engages with a corresponding groove on the inside of the bush when in operation. The head of the fastener has an axially projecting section with lobes on its outer surface. Release is possible with a hollow key having a cylindrical portion with an inner surface of a corresponding shape to the lobate section of the fastener. The lobes can be varied in shape so as to ensure that they are individual.

However, it has become evident that previously known devices and assemblies for theft-proofing can be circumvented by thieves or vandals. For example, wheel bolts having heads with specially designed lock grooves or the like that are intended to receive corresponding projecting portions of a special wrench can in many cases still be rotated by means of a slightly small socket or the like that is punched down or pressed down around the head. Special socket wrench sets have been offered for sale and used for this purpose by unauthorized persons.

When supposedly theft-proof wheel bolts have a rotatable bush enclosing the head of the bolt, it has been found that unauthorized persons can drill holes and insert a tool between the bush and the head of the wheel bolt in order to achieve a locking between these. By drilling two holes on both sides of the longitudinal axis of the wheel bolt, the wheel bolts can subsequently be released, for example by means of a shaft with holes in positions corresponding to the two holes, despite claiming to theft-proof.

SUMMARY OF THE INVENTION

Accordingly, a first object of the present invention is to provide a screw device for theft-proofing vehicle wheels which solves the above-mentioned problem with the previously known technique, and which prevents unauthorized persons from removing one or several vehicle wheels from an unattended motor vehicle on which the vehicle wheels are retained by means of one or several screw devices according to the invention.

In accordance with the present invention, this first object of the invention is accomplished by means of the screw device having a screw, a sleeve and a lock member. The screw has a head and a threaded portion intended to be screwed into a thread of a wheel hub. Thereby, the threaded portion is intended to be screwed into the thread of the wheel hub via a recess arranged in a central portion of a vehicle wheel. The lock member comprises an endless, smoothly undulating or curved lock groove in its first end, and a coupling portion in its second end for torsionally rigid coupling to the head. The sleeve is designed for being retained between the screw and the lock member after the coupling. The dimensions of the sleeve are adapted to the dimensions of the recess so that regions of the central portion adjacent to the recess encompass substantially entirely and with close fitting a circumference of the sleeve when the threaded portion has been screwed into the thread.

A second object of the invention is to provide an assembly for theft-proofing vehicle wheels by utilizing the screw device according to the invention. This second object is achieved by means of the assembly having a vehicle wheel in which a central portion forms at least one through-opening, a wheel hub with at least one thread for screwing in or out a threaded portion of a screw. The central portion is designed with a recess encompassing the through-opening. The threaded portion is screwed through the recess into the thread of the wheel hub. The assembly further has a key that turns the screw around its longitudinal axis via a lock member, which is coupled to the screw in a torsionally rigid way. The key is designed to fit into an endless, smoothly undulating or curved lock groove in a first end of the lock member. The assembly further has a sleeve that is retained between the screw and the lock member. According to the invention, the dimensions of the sleeve are adapted to the dimensions of the recess so that regions of the central portion adjacent to the recess encompass substantially entirely and with close fitting a circumference of the sleeve when the threaded portion has been screwed into the thread.

A third object of the present invention is to provide a motor vehicle with theft-proofed vehicle wheels. This third object of the invention is achieved by means of the motor vehicle having a plurality of wheel hubs and at least one vehicle wheel that is/are mounted to the wheel hub or hubs by means of at least one screw device according to the invention, and being part of at least one assembly according to the invention.

BRIEF DESCRIPTION OF THE DRAWINGS

The invention will be described in the following with reference to the attached drawings, in which.

DETAILED DESCRIPTION OF THE INVENTION

Figure 1:
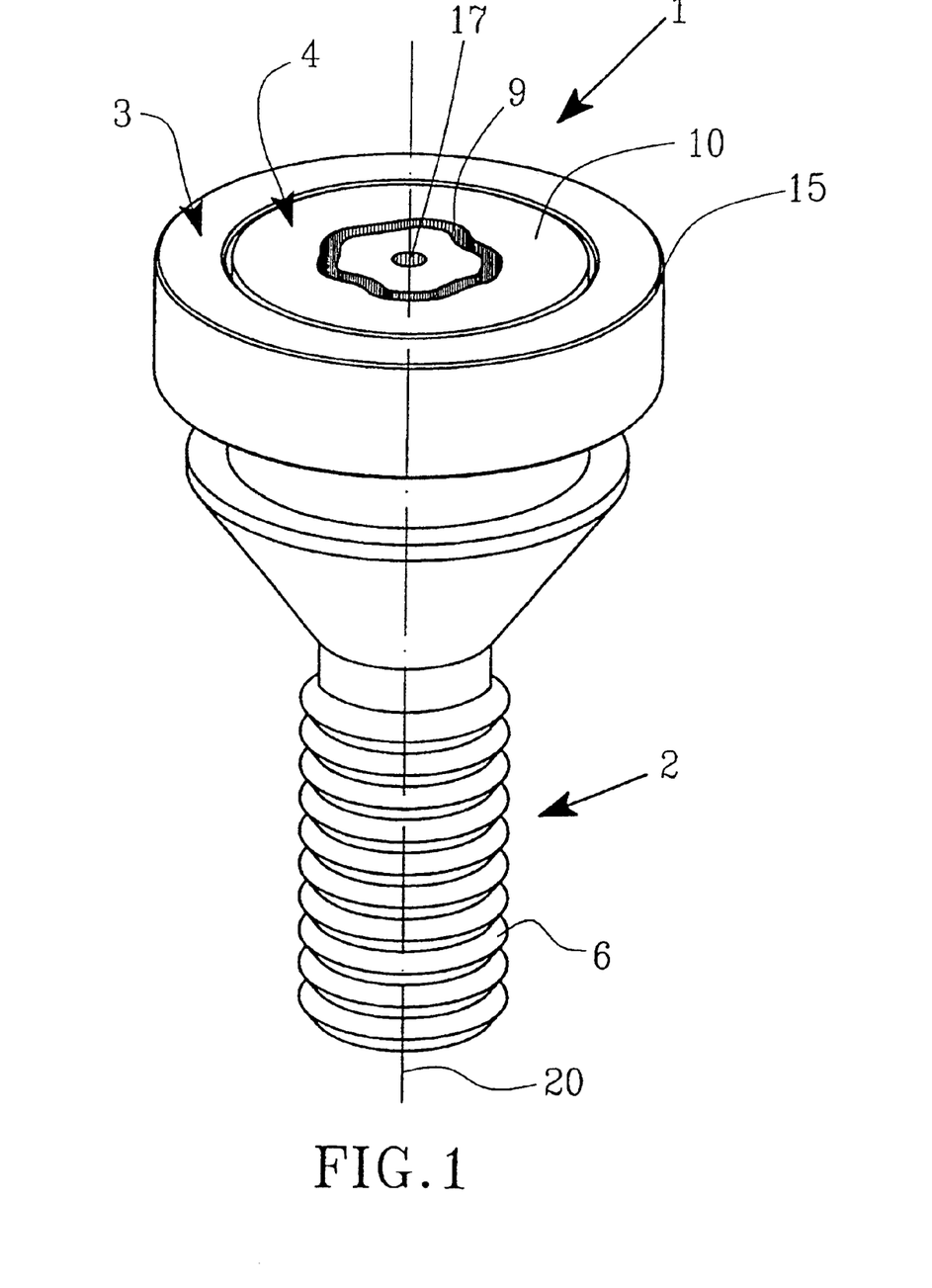
FIG. 1 shows a side perspective view of a screw device according to a preferred embodiment of the invention.
Figure 2:
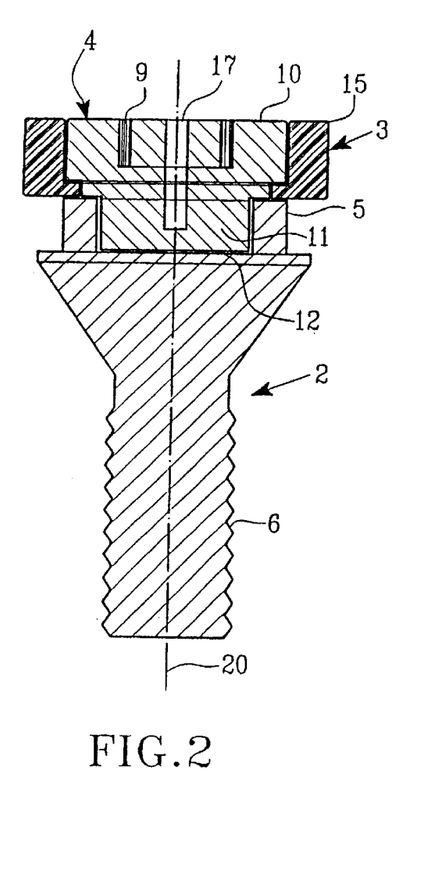
FIG. 2 shows a side cross-sectional view through the central portion of the screw device shown in FIG. 1.
Figure 3:
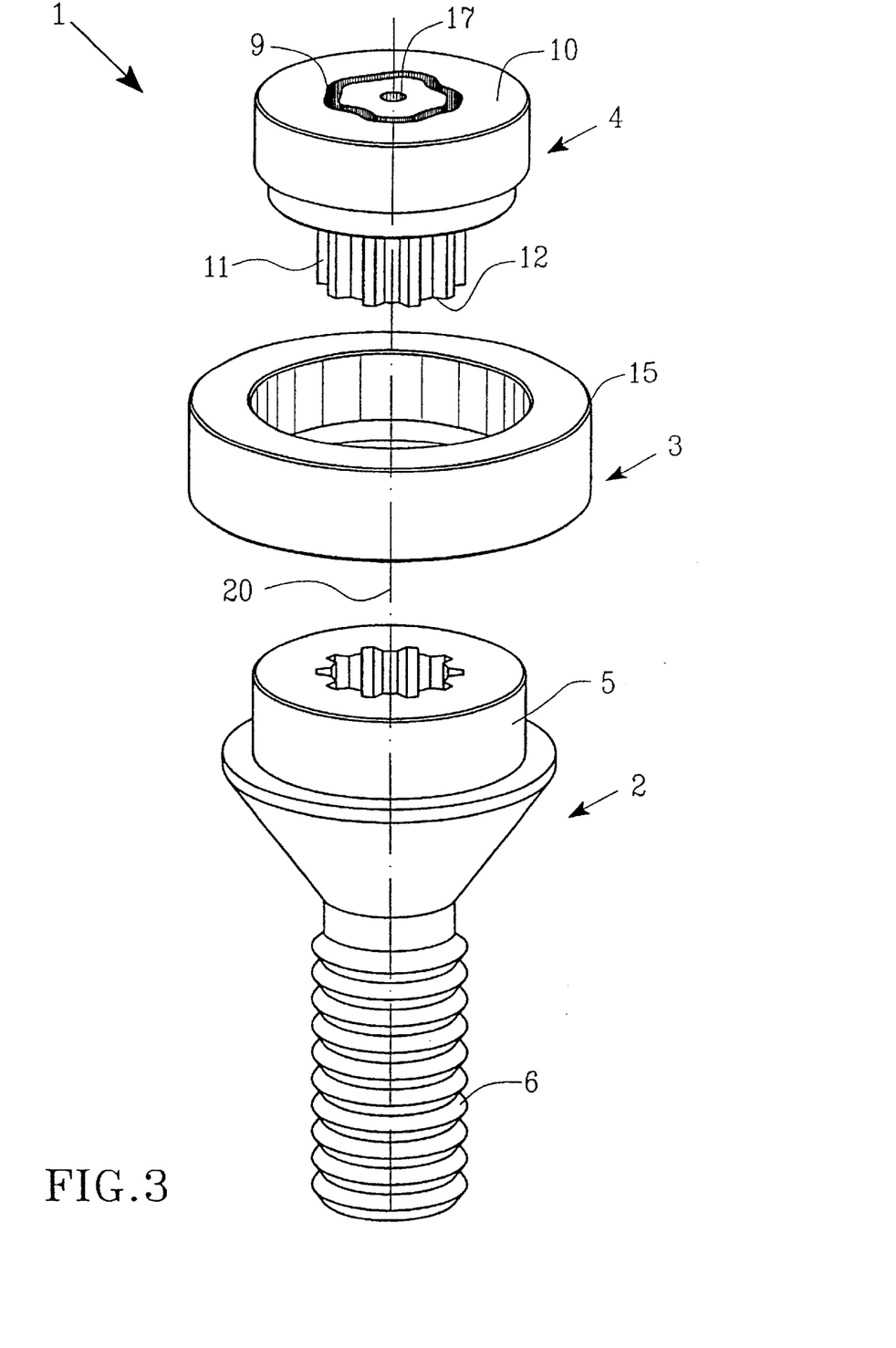
FIG. 3 shows an exploded perspective view of the different parts of the screw device shown in FIGS. 1 and 2.
Figure 4:
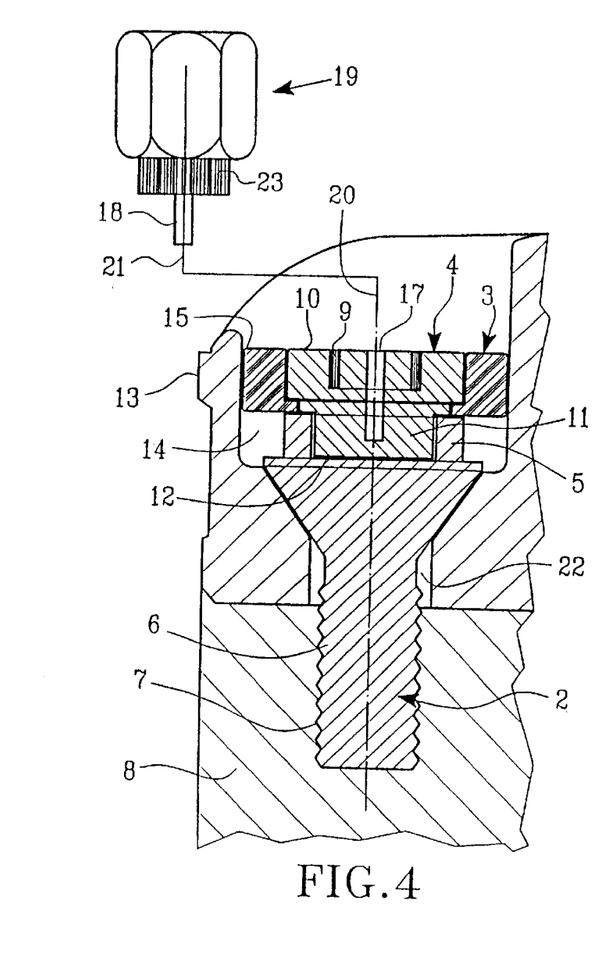
FIG. 4 shows a cross-sectional view through an assembly according to a preferred embodiment of the invention.

In FIGS. 1–3, different views of a screw device according to a preferred embodiment of the invention are shown. In FIG. 4, the screw device is shown when being part of an assembly according to a preferred embodiment of the invention, while FIGS. 5–8 show alternative embodiments of the assembly according to the invention.

The screw device 1, 1' according to the invention and the preferred embodiment comprises a screw 2, 2', a sleeve 3, 3' and a lock member 4, 4'. Thereby, the screw 2, 2' has a head 5, 5' and a threaded portion 6, 6' intended to be screwed into a thread 7, 7' of a wheel hub 8, 8'. The threaded portion 6, 6' of the screw 2, 2' is intended to be screwed into the thread 7, 7' of the wheel hub 8, 8' via a recess 14, 14' arranged in a central portion of a vehicle wheel 13, 13'. The lock member 4, 4' has an endless, smoothly undulating or curved lock groove 9, 9' in its first end 10, 10'. This design of the lock groove 9, 9' makes it more difficult for an unauthorized person to obtain any stable contact surface inside the lock groove with a tool which is not intended therefore. The shape and other dimensions of the lock groove can of course be varied in a number of different ways within the scope of the invention, as long as the lock groove does not have any edges or sharp notches which could facilitate undue thefts with tools or keys which are not adapted to the lock groove.

The lock member 4, 4' further comprises a coupling portion 11, 11' in its second end 12, 12' for torsionally rigid coupling to the head 5, 5' of the screw 2, 2'. This enables the screw 2, 2' and lock member 4, 4' to rotate together after coupling if a sufficient torsional force is applied onto the lock member 4, 4'. Accordingly, "torsionally rigid" means that the lock member 4, 4' and the head 5, 5' cannot rotate in relation to each other, but only together with each other.

The above-mentioned sleeve 3, 3' is designed so that it is retained between the screw 2, 2' and the lock member 4, 4' after coupling, wherein the sleeve is difficult to remove without any special tools or without the screw device being heavily deformed.

According to a preferred embodiment of the invention, the dimensions of the sleeve 3, 3' are adapted to the dimensions of the recess 14, 14' so that regions of the central portion adjacent to the recess 14, 14' encompass substantially entirely and with close fitting a circumference 15, 15' of the sleeve 3, 3' when the threaded portion 6, 6' has been screwed into the thread 7, 7'. When being used in an assembly according to the invention, screw devices according to a preferred embodiment will make it impossible for an unauthorized person to press or punch down an encompassing socket or a similar tool with a slightly smaller inner dimension than the outer dimensions of the sleeve 3, 3' around the sleeve 3, 3' in order to obtain a locking between the sleeve 3, 3' and the lock member 4, 4' since there will be no space available for this.

According to a preferred embodiment of the screw device, the sleeve 3, 3' encompasses the first end 10, 10' of the lock member 4, 4' with close fitting. This makes it more difficult for an unauthorized person to insert a tool not intended therefore with the intention of reaching the head 5, 5' of the screw 2, 2'.

Furthermore, according to a preferred embodiment, the sleeve 3, 3' consists of a first material with a high resistance against crack-formation. The first end 10, 10' consists of a second material with the first material softer than the second material so that the sleeve 3, 3' is more easily deformed than the first end 10, 10' when subjected to mechanical damage. This implies that it becomes very difficult for an unauthorized person to drill in holes or to punch in sharp objects between the sleeve 3, 3' and the lock member 4, 4 with the intent of obtaining a stable locking between the sleeve and the lock member, since a drill or a sharp object will slip out into the softer first material of the sleeve so that no stable locking and contact surface can be obtained.

The high resistance of the first material against crack formation also makes it very difficult to break the sleeve without destroying the surrounding and underlying material surfaces. In a preferred embodiment of the invention, the sleeve 3, 3' consists of an aluminum alloy with a high stretchability, whereas the first end 10, 10' is a steel alloy with a high hardness. However, it is also conceivable to have embodiments of the screw device of another suitable material choice for the sleeve and the first end.

Figure 5:
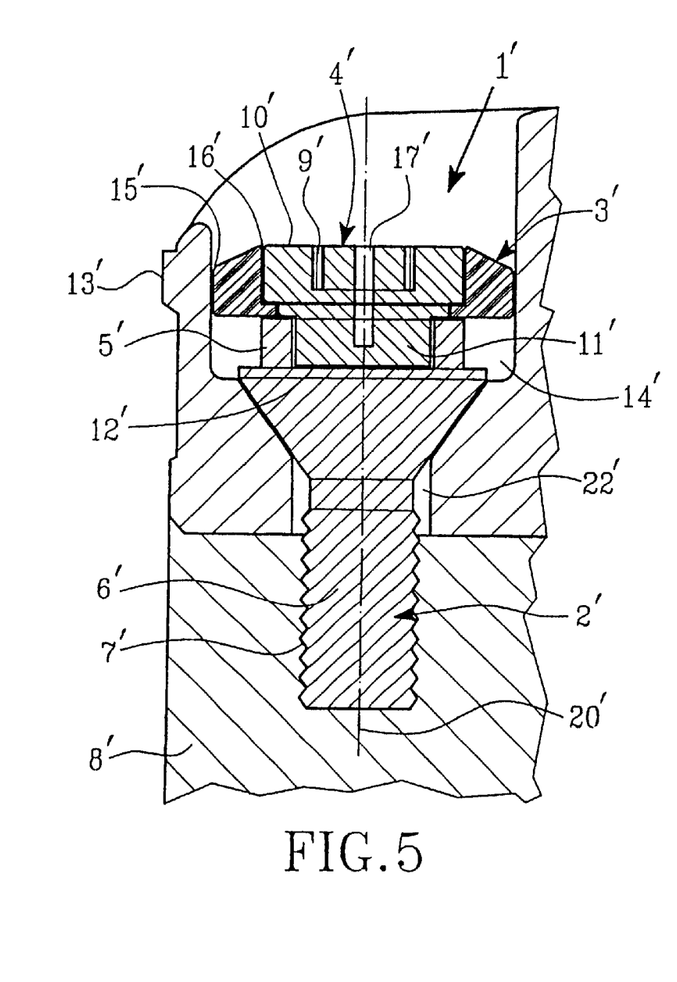
FIG. 5 shows a cross-sectional view through an assembly according to an alternative embodiment of the invention.

According to an alternative embodiment of the screw device according to the invention as being part of the assembly shown in FIG. 5, the sleeve 3' comprises a first circumference 16' and a second circumference 15'. The first circumference 16' closely encompasses the first end 10' of the lock member 4'. The second circumference 15' is located closer to the screw 2' and is larger than the first circumference 16'. Accordingly, this implies that the sleeve 3' will exhibit a small outer diameter in the outermost end, and a larger outer diameter closest to the surface of the vehicle wheel that the screw device retains. These sloping outer walls of the sleeve will make the insertion of objects which are not intended therefore between the sleeve 3' and the lock member 4' difficult, since such objects tend to slip along the sloping sleeve walls without afflicting any or only nominal damage. Screw devices according to this alternative embodiment are preferably utilized as shown in FIG. 5. There, a sleeve 3' with sloping outer walls is cooperating with a recess in a central portion of a vehicle wheel. The sleeve can also be utilized for external mounting without cooperating with any recess when utilized in an assembly according to the invention.

Figure 6:
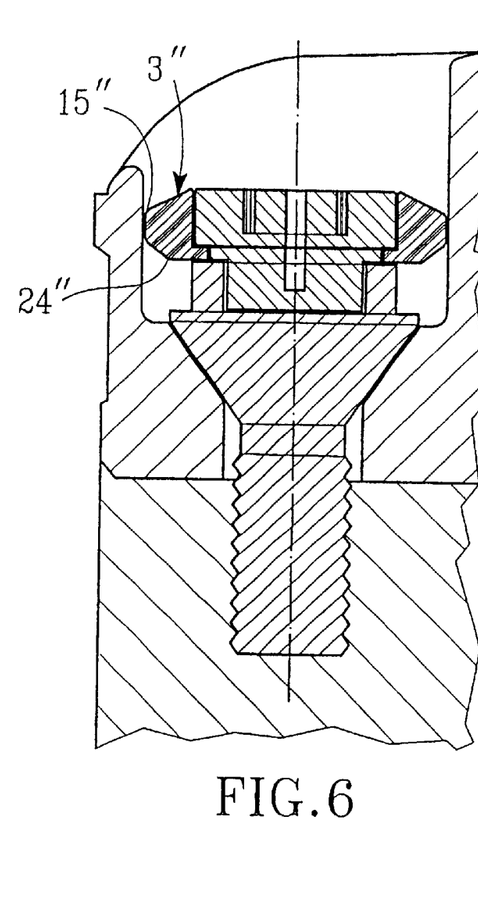
FIGS. 6–8 show three further cross-sectional views through assemblies according to three further alternative embodiments of the invention.
Figure 8:
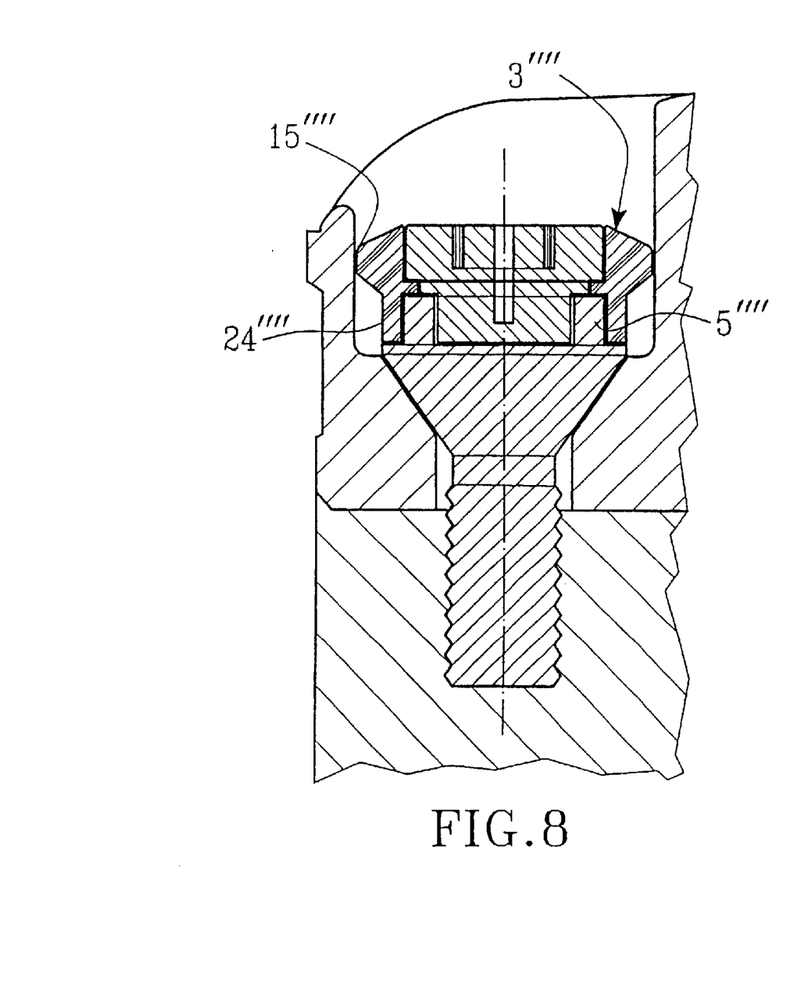

As is evident from those embodiments of the assembly shown in FIGS. 6 and 8, the sleeve 3", 3"" of the screw device may also comprise a third circumference 24", 24"" that is smaller than the second circumference 15", 15"". Among other things, this can be advantageous from a weight-saving point of view.

Figure 7:
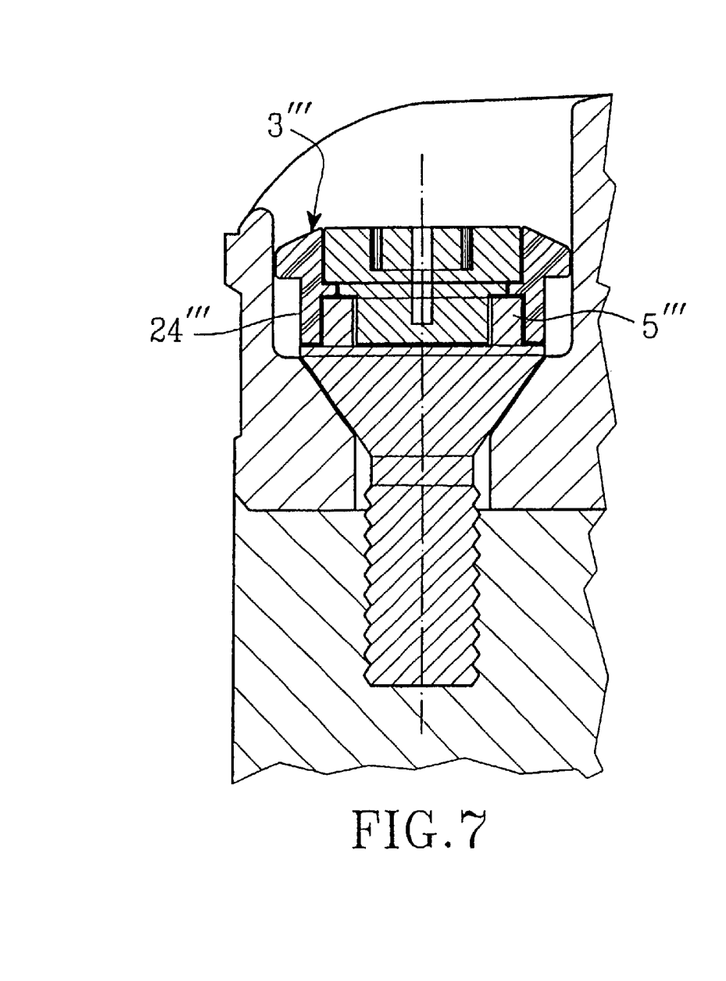

As shown in FIGS. 7 and 8, the screw device may also be designed so that the third circumference 24"', 24"" of the sleeve 3"', 3"'' encompasses at least a portion of the head 5"', 5"". This makes it even more difficult for unauthorized persons to be able to reach the head of the screw.

In a particularly advantageous embodiment of the invention, the sleeve 3, 3' is dimensioned so that it can be rotated substantially freely in relation to the lock member 4, 4' and the screw 2, 2' after the coupling. This makes it even more difficult to dislodge the position of a protected screw 5, 5' with a tool which is not intended therefore in a screw assembly according to the invention.

In advantageous embodiments of the screw device according to the invention as shown in FIGS. 1–5, the coupling portion 11, 11' has a protruding portion dimensioned to be pressed into a recess in the head 5, 5' of the screw 2, 2' when accomplishing the torsionally rigid coupling. However, it is also conceivable for the coupling portion to have a recess in the lock member, and the recess be dimensioned to be pressed over the head of the screw during coupling. This may also be accomplished with another suitable type of coupling between the screw 2, 2' and the lock member 4, 4'. From an economic point of view, it is particularly advantageous if the coupling portion 11, 11' is designed to be coupled to wheel screws or wheel bolts with standard dimensions in a torsionally rigid way.

In a particularly advantageous embodiment of the screw device according to the invention, the first end 10, 10' of the lock member 4, 4' has a recess 17, 17' for a guiding pin 18 of a key 19 that is intended to turn the screw 2, 2' around its longitudinal axis 20, 20' via the lock member 4, 4' after insertion into the lock groove 9, 9'. According to this embodiment, the screw device is designed for facilitating the insertion of a key of an assembly according to the invention.

Following, a preferred embodiment and a number of advantageous embodiments of an assembly according to the invention will be described with particular reference to FIGS. 4 and 5. Thereby, reference is also made to applicable portions of the foregoing description.

According to a preferred embodiment, the assembly has a vehicle wheel 13, 13' in which a central portion forms at least one through-opening 22, 22'. Thereby, the central portion is typically a suitably designed rim around which a car tire is intended to be mounted in order to form the vehicle wheel. However, it is also conceivable that the central portion is included as a part of a rim, or constitutes a central portion of a vehicle wheel with spokes.

The assembly further has a wheel hub 8, 8' with at least one thread 7, 7' for screwing in or out a threaded portion 6, 6' of a screw 2, 2'. A key 19 intended to turn the screw 2, 2' around its longitudinal axis via a lock member 4, 4' that is coupled to said screw 2, 2' in a torsionally rigid way. The key 19 is designed to fit into an endless, smoothly undulating or curved lock groove 9, 9' in a first end 10, 10' of the lock member 4, 4'. As mentioned above, this design of the lock groove renders a stable coupling to unauthorized tools or keys difficult.

The assembly further has a sleeve 3, 3' that is retained between the screw 2, 2' and the lock member 4, 4'.

In a preferred embodiment of the assembly according to the invention, the central portion is designed with a recess 14, 14' encompassing the through-opening 22, 22' and through which recess 14, 14' the threaded portion 6, 6' is to be screwed into the thread 7, 7' of the wheel hub 8, 8'. The dimensions of the sleeve 3, 3' are adapted to the dimensions of the recess 14, 14', so that regions of the central portion adjacent to the recess 14, 14' encompass substantially entirely and with close fitting a circumference 15, 15' of the sleeve 3, 3 when the threaded portion 6, 6 has been screwed into the thread 7, 7'. As is evident from the above, this prevents unauthorized tools from being pressed or punched down around the sleeve.

According to a preferred embodiment, the sleeve 3, 3' further encompasses the first end 10, 10' of the lock member 4, 4' with close fitting. The sleeve 3, 3' is comprised of a first material with high resistance to crack-formation, whereas the first end 10, 10' consists of a second material. Accordingly, the first material is softer than the second material so that the sleeve is more easily deformed than the first end 10, 10' when subjected to mechanical damage.

According to an alternative embodiment of the assembly, shown in FIG. 5, the sleeve 3' comprises a first circumference 16' and a second circumference 15'. The first circumference 16' closely encompasses the first end 10' of the lock member 4'. The second circumference 15' is located closer to the screw 2' and is larger than the first circumference 16'. As is evident from above, this design of the sleeve makes the insertion or drilling-in of an unauthorized tool between the sleeve 3' and the lock member 4' difficult.

As is evident from the embodiments of the assembly according to the invention shown in FIGS. 6 and 8, the sleeve 3", 3"" may also comprise a third circumference 24", 24"" that is smaller than the second circumference 15", 15"". As is evident from above, this can be advantageous, among other things, from a weight-saving point of view.

As shown in FIGS. 7 and 8, the screw device in the assembly may also be designed so that the third circumference 24'", 24"" of the sleeve 3'", 3"" encompasses at least a portion of the head 5'", 5"". As is evident from above, this makes it even more difficult for unauthorized persons to reach the head of the screw.

According to a particularly preferred embodiment of the assembly according to the invention, the sleeve 3, 3' is dimensioned so that it can be rotated substantially freely in relation to the lock member 4, 4' and the screw 2, 2' after the torsionally rigid coupling. This makes it even more difficult for an unauthorized person to influence the screw 2, 2 via the sleeve 3, 3' from the outside.

In another particularly advantageous embodiment of the assembly according to the invention, the first end 10, 10' of the lock member 4, 4' has a recess 17, 17' for a guiding pin 18 of the key 19. The recess 17, 17' and the guiding pin 18 are arranged and dimensioned so that, when rotating the key 19 around the longitudinal axis 21 of the guiding pin, the key 19 fits into the endless, smoothly undulating or curved lock groove 9, 9' of the lock member 4, 4'. The arrangement of a guiding pin on the key which cooperates with a recess in the lock member enables a user to initially insert only the tip of the guiding pin 18 projecting from the key 19 into the recess 17, 17' in order to subsequently rotate the key 19 until it enters the correct position enabling a key member 23 of the key to be pressed into the lock groove 9, 9'. In this way, a user having the correct key 19 can obtain a coupling between the key 19 and the lock member 4, 4' without any difficulty.

A preferred embodiment of a motor vehicle with theft-proofed vehicle wheels comprises a plurality of wheel hubs 8, 8' and at least one vehicle wheel 13, 13'. The vehicle wheel 13, 13' is mounted, or the vehicle wheels are mounted, to the wheel hub 8, 8' by means of at least one screw device 1, 1'.

In a particularly advantageous embodiment of the motor vehicle of the invention, the motor vehicle is a private car wherein the central portions of the vehicle wheels 13, 13' have exclusive rims with a special design. In this embodiment, the theft proofing provided by the present invention is of a particularly high value since the rims are very expensive and are unusually theft-desirable.

Within the scope of the invention, only one, several or all vehicle wheels are theft-proofed by means of one or several assemblies according to the invention. Furthermore, one, several or all included screw devices may be in accordance with the invention.

Where the geometric design of the sleeve in the screw device is concerned, many different embodiments are conceivable. Accordingly, it is conceivable that recesses or cavities have been made in the sleeve with the intention of saving weight and material. In such embodiments the recesses or cavities must not make it easier for unauthorized persons to achieve locking between the sleeve and the screw or to remove the sleeve by means of breaking it.

In the case of a sleeve with the basic shape as shown in FIG. 1, it is conceivable with a suitable number of recesses or grooves which extend radially inwards from the circumference 15 of the sleeve 3. Embodiments with axially extending through-holes or radial recesses in the periphery of the sleeve are conceivable. It is also conceivable that a suitable number of recesses are made in the surface of the sleeve 3 which faces upwards in FIG. 1 between the circumference and the central portion.

Similar recesses, cavities or holes can be made in sleeves 3', 3'', 3''', 3'''' with the basic shapes shown in FIGS. 5–8. Accordingly, the mantle surface of the sleeve 3'', 3''' can also be beveled, or the sleeve 3'''' can be designed with a smaller circumference 24'''' at the bottom than at the top 15''''.

Many different types of material for use as the first material in the sleeve and as the second material in the first end of the lock member may be used. For example, the sleeve may be a reinforced polymer material and the lock member a metal alloy with a higher hardness than the polymer material.

The present invention can be advantageously practiced so that a single screw device is included in the assembly, while the remaining wheel screws are of a conventional type.

Where a combination of conventional wheel screws and screw devices according to the invention are used for mounting the same vehicle wheel, the geometric design and choice of material for the sleeve and lock member can also be utilized for regulating the total weight of the screw device so that it corresponds as well as possible to the weight of conventional wheel screws. This makes it possible to avoid bias problems with the mounted vehicle wheel.

Furthermore, it should be noted that the expression "screw" used herein is intended to include all types of members which can be screwed in, independently of the cross-section, length or geometrical design of the threaded portion.

Furthermore, the key part of the assembly can be advantageously attached to or fitted together with a suitably designed handle, or function as an intermediate adapter for coupling to a pneumatic screw driver.

In order to render undue thefts even more difficult, assemblies according to the invention are advantageously designed with individual keys/lock grooves.

Figure 9:
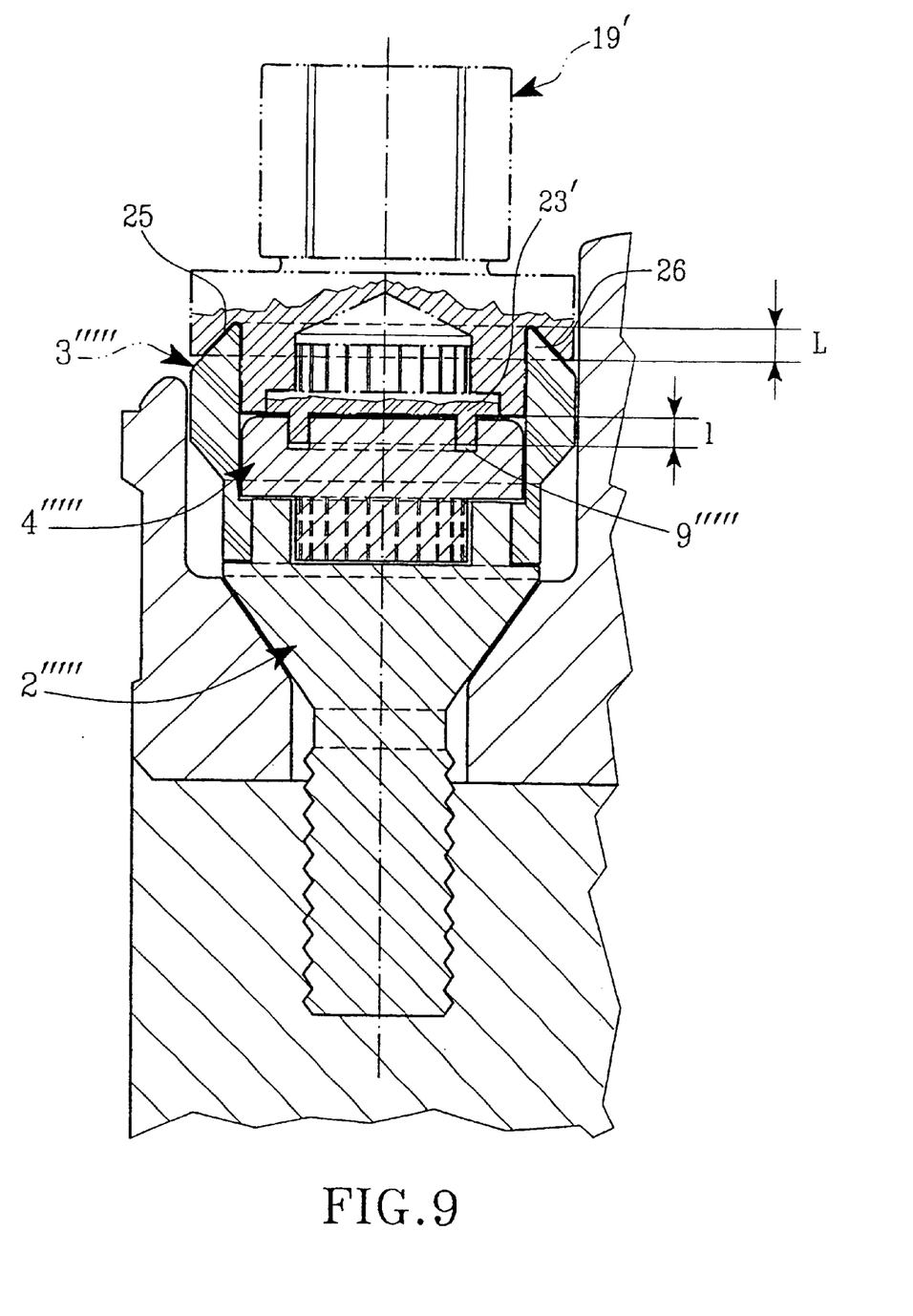
FIG. 9 shows a cross-sectional view through an assembly according to a preferred embodiment of the invention.

FIG. 9 shows an assembly according to a particularly preferred embodiment of the invention, including a screw device comprising a screw 2'''', a sleeve 3'''' and a lock member 4''''. Furthermore, the assembly comprises a key 19', which is indicated with dash dotted lines in FIG. 9. In the particularly preferred embodiment, a male coupling portion of a key member 23' has been pressed into a female coupling portion in the key 19'.

Furthermore, the key 19' is provided with an annular recessed portion 25 which in FIG. 9 faces downwards towards the sleeve 3'''' and receives an annular protruding portion 26 of the sleeve 3''''. As is evident from FIG. 9, the recessed and protruding portions both have cooperating conical or V-shaped cross sections. When an end user wants to couple the key 19' to the lock member 4'''', these corresponding conical or V-shaped surfaces will guide the key member 23' into its correct position in the lock groove 9''' when the end user presses the key 19' against the protruding portion 26 of the sleeve 3'''' and simultaneously rotates the key 19' around its longitudinal axis. This is made possible by distance 1 being smaller than distance L in FIG. 9. The protruding portion 26 of the guiding surface of the sleeve 3'''' may protrude from the upper surface of the lock member 4'''' as shown in FIG. 9, but may also be flush with or slightly below the level of said upper surface. Accordingly, this geometrical design replaces the above-mentioned guiding pin. Furthermore, this embodiment is advantageous from an economic point of view since only the key member 23' and the lock member 4'''' have to be replaced in order to provide individual assemblies.

The present invention should by no means be regarded as being limited to what has been described in the foregoing in connection with the preferred embodiments, or to what is shown in the attached drawings, but the scope of the invention is defined by the accompanying claims.

What is claimed is:

1. A screw device for theft-proofing vehicle wheels comprising:
   a screw having a head and a threaded portion adapted to be screwable into a thread of a wheel hub via a recess arranged in a central portion of a vehicle wheel;
   a lock member having an endless, smoothly undulating lock groove in a first end and a coupling portion in a second end for torsionally rigid coupling to said head;
   a sleeve retained between said screw and said lock member after said coupling portion, and the sleeve having dimensions that position a substantial entirety of a circumference of the sleeve in close proximity with the central portion of the wheel adjacent to the recess when the threaded portion has been screwed into the thread of the wheel hub;
   wherein the sleeve closely encompasses a first end of the lock member;
   the sleeve having a first material with high resistance against crack-formation;
   the first end at the lock member further comprising a second material;
   wherein the first material is softer than the second material so that the sleeve can be deformed more easily than the first end when subjected to mechanical damage; and
   wherein the sleeve is dimensioned so that it can be rotated substantially freely in relation to the lock member and the screw after the coupling portion.

2. The screw device according to claim 1 wherein the sleeve further comprises a first circumference and a second circumference, the first circumference closely encompassing the first end of the lock member, and the second circumference being located closer to the screw and being larger than the first circumference.

3. The screw device according to claim 2 wherein the sleeve further comprises a third circumference that is smaller than the second circumference.

4. The screw device according to claim 3 wherein the third circumference of the sleeve encompasses at least a portion of the head.

5. The screw device according to claim 1 wherein the coupling portion is further comprised of a protruding portion dimensioned for being pressed into a recess in the head of the screw when accomplishing the torsionally rigid coupling.

6. The screw device according to claim 1 wherein the coupling portion further comprises a recess in the lock member, the recess being dimensioned to be pressed over the head of the screw when accomplishing the torsionally rigid coupling.

7. The screw device according to claim 1 wherein the first end of the lock member comprises a recess for a guiding pin of a key intended to turn the screw around its longitudinal axis via said lock member after insertion in the lock groove.

8. The screw device according to claim 1 wherein the sleeve further comprises a protruding portion for cooperation with a recessed portion of a key intended to turn the screw around its longitudinal axis via said lock member after insertion in the lock groove.

* * * * *

UNITED STATES PATENT AND TRADEMARK OFFICE
CERTIFICATE OF CORRECTION

| | | |
|---|---|---|
| PATENT NO. | : 6,736,579 B2 | Page 1 of 1 |
| APPLICATION NO. | : 09/882878 | |
| DATED | : May 18, 2004 | |
| INVENTOR(S) | : Christian Lonnqvist et al. | |

It is certified that error appears in the above-identified patent and that said Letters Patent is hereby corrected as shown below:

Title page, item (30) should read as follows:
Foreign Application Priority Data
December 18, 1998 (SE)...........9804440-7

Signed and Sealed this

Twelfth Day of May, 2009

JOHN DOLL
*Acting Director of the United States Patent and Trademark Office*